(12) United States Patent
Hahn

(10) Patent No.: US 11,732,764 B2
(45) Date of Patent: Aug. 22, 2023

(54) DUAL CLUTCH TRANSMISSION

(71) Applicant: MERCEDES-BENZ GROUP AG, Stuttgart (DE)

(72) Inventor: Peter Hahn, Stuttgart (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 17/800,970

(22) PCT Filed: Jan. 26, 2021

(86) PCT No.: PCT/EP2021/051664
§ 371 (c)(1),
(2) Date: Aug. 19, 2022

(87) PCT Pub. No.: WO2021/164991
PCT Pub. Date: Aug. 26, 2021

(65) Prior Publication Data
US 2023/0060224 A1   Mar. 2, 2023

(30) Foreign Application Priority Data
Feb. 20, 2020   (DE) .................... 10 2020 001 100.4

(51) Int. Cl.
*F16D 25/06*   (2006.01)
*F16D 25/0638*   (2006.01)
(Continued)

(52) U.S. Cl.
CPC ......... *F16D 25/0638* (2013.01); *F16D 25/10* (2013.01); *B60K 6/387* (2013.01); *B60K 6/547* (2013.01); *F16D 2021/0661* (2013.01)

(58) Field of Classification Search
CPC ............. F16D 25/0638; F16D 25/10; F16D 2021/0661; F16D 13/385; B60K 6/387; B60K 6/547
See application file for complete search history.

(56) References Cited

U.S. PATENT DOCUMENTS

2011/0259698 A1\* 10/2011 Arnold .................... F16D 21/06
                                                                192/48.1
2011/0266110 A1\* 11/2011 Arnold .................... F16D 3/66
                                                                192/66.1
(Continued)

FOREIGN PATENT DOCUMENTS

DE   19809534 A1   9/1999
DE   10114281 A1   9/2002
(Continued)

OTHER PUBLICATIONS

International Search Report dated Apr. 20, 2021 in related/corresponding International Application No. PCT/EP2021/051664.
(Continued)

*Primary Examiner* — Stacey A Fluhart
*Assistant Examiner* — Farhana Pervin
(74) *Attorney, Agent, or Firm* — Patent Portfolio Builders PLLC

(57) ABSTRACT

A dual clutch transmission includes an input shaft and a first clutch, which has a first input disc carrier, a first output disc carrier, a first force transfer region, and a first actuating piston. The transmission has a second clutch having a second input disc carrier, a second output disc carrier, a second force transfer region, and a second actuating piston. The transmission includes a first partial transmission having a first partial transmission input shaft, and a second partial transmission having a second partial transmission input shaft. The input shaft, the first input disc carrier, and the second input disc carrier are non-rotationally connected to one another. The first output disc carrier is non-rotationally connected to the first partial transmission input shaft. The second output disc carrier is non-rotationally connected to the second partial transmission input shaft. The second (Continued)

partial transmission input shaft is arranged coaxially and radially surrounding the first partial transmission input shaft.

10 Claims, 1 Drawing Sheet

(51) Int. Cl.
*F16D 25/10* (2006.01)
*B60K 6/387* (2007.10)
*B60K 6/547* (2007.10)
*F16D 21/06* (2006.01)

(56) References Cited

U.S. PATENT DOCUMENTS

| | | | |
|---|---|---|---|
| 2017/0268580 A1* | 9/2017 | Dole | F16D 25/10 |
| 2021/0023932 A1* | 1/2021 | Park | F16D 13/683 |
| 2021/0229544 A1* | 7/2021 | Ortmann | B60K 6/38 |

FOREIGN PATENT DOCUMENTS

| | | |
|---|---|---|
| DE | 102005004207 A1 | 8/2006 |
| DE | 102005063248 A1 | 7/2007 |
| DE | 102006027899 A1 | 12/2007 |
| DE | 112007002842 B4 | 9/2009 |
| DE | 102009059944 A1 | 7/2010 |
| DE | 102015208372 A1 | 3/2016 |
| DE | 102017009024 A1 | 3/2019 |
| DE | 102018009392 B3 | 2/2020 |
| EP | 1800929 A2 | 6/2007 |
| WO | 2018054413 A1 | 3/2018 |

OTHER PUBLICATIONS

Office Action created Oct. 19, 2020 in related/corresponding DE Application No. 10 2020 001 100.4.

Written Opinion dated Apr. 20, 2021 in related/corresponding International Application No. PCT/EP2021/051664.

* cited by examiner

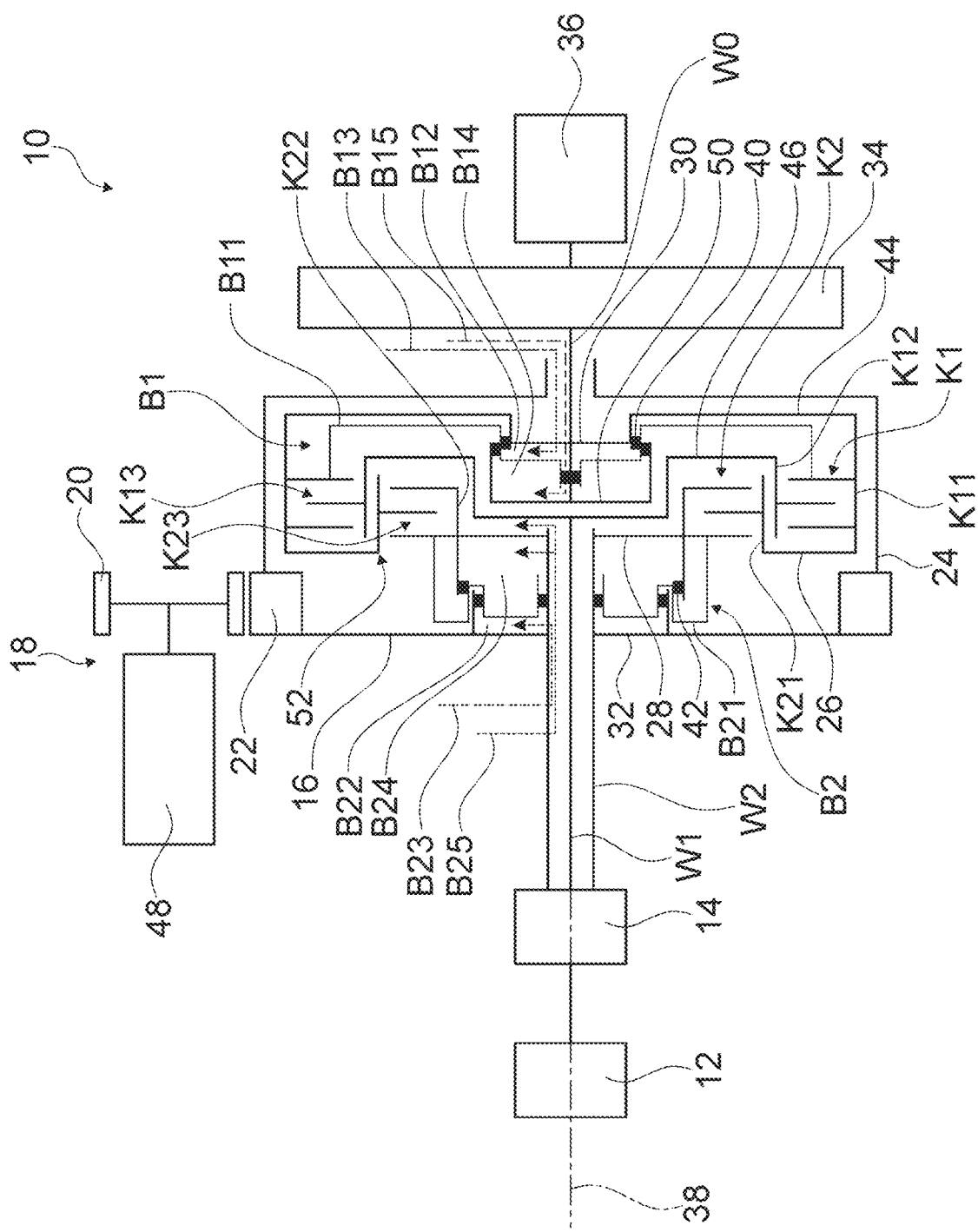

DUAL CLUTCH TRANSMISSION

BACKGROUND AND SUMMARY OF THE INVENTION

Exemplary embodiments of the invention relate to a dual clutch transmission.

DE 10 2006 027 899 A1 discloses a dual clutch transmission with an input shaft, with a first clutch, which has a first input disc carrier, a first output disc carrier, a first force transfer region and a first actuating piston, with a second clutch, which has a second input disc carrier, a second output disc carrier, a second force transfer region and a second actuating piston, with a first partial transmission, which has a first partial transmission input shaft, and with a second partial transmission, which has a second partial transmission input shaft, wherein the input shaft, the first input disc carrier and the second input disc carrier are non-rotationally connected to one another, wherein the first output disc carrier is non-rotationally connected to the first partial transmission input shaft, wherein the second output disc carrier is non-rotationally connected to the second partial transmission input shaft, wherein the second partial transmission input shaft is arranged coaxially to and radially surrounding the first partial transmission input shaft, and wherein the first force transfer region is arranged radially surrounding and axially at least partially overlapping the second force transfer region.

Furthermore, dual clutch transmissions are also known from EP 1 800 929A2, DE 10 2017 009 024 A1, WO 2018/054413 A1, DE 10 2009 059 944 A1, DE 198 09 534 A1, DE 101 14 281 A1, DE 11 2007 002 842 B4, DE 10 2005 063 248 A1, DE 10 2018 009 392 B3 and DE 10 2015 208 372 A1.

Exemplary embodiments of the invention are directed to a generic device with improved properties, in particular with regard to a compact design and extended functionality.

The invention is based on a dual clutch transmission with an input shaft, with a first clutch, which has a first input disc carrier, a first output disc carrier, a first force transmission region and a first actuating piston, with a second clutch, which has a second input disc carrier, a second output disc carrier, a second force transfer region and a second actuating piston, with a first partial transmission, which has a first partial transmission input shaft, and with a second partial transmission, which has a second partial transmission input shaft, wherein the input shaft, the first input disc carrier and the second input disc carrier are non-rotationally connected to one another, wherein the first output disc carrier is non-rotationally connected to the first partial transmission input shaft, wherein the second output disc carrier is non-rotationally connected to the second partial transmission input shaft, the second partial transmission input shaft is arranged coaxially to and radially surrounding the first partial transmission input shaft, and wherein the first force transfer region is arranged radially surrounding and axially at least partially overlapping the second force transmission region.

It is proposed that the dual clutch transmission has a connecting plate that radially overlaps with the first force transfer region, the connecting plate being non-rotationally connected to the second partial transmission input shaft, extending radially from the second partial transmission input shaft, radially overlapping with at least the first force transfer region and being arranged axially between the partial transmissions and the force transfer regions, wherein a first actuation space of the first clutch is arranged on a side of the first force transfer region facing towards the input shaft and is delimited by a first wall that is non-rotationally connected to the input shaft. The dual clutch transmission is preferably provided for use in a motor vehicle. "Provided" is to be understood in particular as being specially designed and/or specially equipped. The fact that an object is provided for a specific function is to be understood in particular to mean that the object fulfils and/or executes this specific function in at least one application and/or operating state. The dual clutch transmission is preferably coupled to an internal combustion engine. The dual clutch transmission comprises, in particular, a main axis of rotation and two auxiliary axes of rotation. Here, a "main axis of rotation" is to be understood, in particular, as an axis of rotation defined by at least one drive shaft. Preferably, this should be understood to mean, in particular, an axis of rotation defined by the drive-side input shaft of the dual clutch transmission. An "auxiliary axis of rotation" is to be understood, in particular, as an axis of rotation, in particular of a countershaft, which is offset in parallel to the main axis of rotation.

In particular, the first clutch and the second clutch form a dual clutch of the dual clutch transmission. The dual clutch is advantageously designed to be power-shiftable. The terms "axial" and "radial" relate to the main axis of rotation, wherein the term "axial" denotes a direction running in parallel or coaxially to the main axis of rotation, and the term "radial" denotes a direction running perpendicularly to the main axis of rotation. "Radially overlapping" is to be understood to mean that the corresponding components, assemblies, or installation spaces radially intersect when viewed along the main axis of rotation. It should preferably be understood that at least one straight line extending in parallel to the main axis of rotation intersects all corresponding components, assemblies, or installation spaces. The first force transfer region and the connecting plate are preferably arranged at least substantially in the same radial extension region. "Radially surrounding" should be understood to mean radially outside, in particular, starting from the main axis of rotation. "Overlapping axially" should be understood to mean that the corresponding components, assemblies, or installation spaces interest axially when viewed along the main axis of rotation. It should preferably be understood that at least one straight line extending orthogonally to the main axis of rotation intersects all corresponding components, assemblies, or installation spaces. The first clutch and the second clutch are preferably arranged at least substantially in the same axial extension region. "At least substantially in the same axial extension region" is to be understood here as meaning that the first clutch and the second clutch intersect in an axial extension region by more than 75%, preferably more than 90% and particularly preferably more than 95%. Particularly preferably, the first clutch and the second clutch have the same axial extension region. The first clutch is designed, in particular, as a first disc clutch. The second clutch is designed, in particular, as a second disc clutch. A "force transfer region" should be understood to mean a region of a clutch in which, at least in an actuated state of the clutch, a force transfer, in particular a form-fit and/or force-fit force transfer, takes place between an input side of the respectively allocated clutch and the output side of the respectively allocated clutch. The force transfer region is preferably formed by a region of the inner discs and the outer discs of the respective clutch. The force transfer region is formed, in particular, by a disc pack. The first force transfer region and the second force transfer region are preferably arranged so that they at least partially overlap axially. The second actuating piston is preferably arranged at least partially radially overlapping with the first actuating piston. An actuation direction of the first actuation piston preferably points away from the internal combustion engine in the direction of the partial transmission. An actuation direction of the second actuation piston preferably points in particular away from the partial transmissions in the direction of the internal combustion engine. The first wall is preferably arranged on a side of the first actuation space facing away from the partial transmissions. The first wall is preferably arranged on a side of the first force transfer region facing towards the internal combustion engine. The first actuation space is arranged between the first wall and the first actuation piston. Preferably, the first wall extends radially outwards starting from the input shaft. The dual clutch transmission preferably has a first input plate, by means of which the input shaft is non-rotationally connected to the first input disc carrier. Particularly preferably, the first input plate is arranged axially on a side of the force transfer regions facing away from the partial transmissions. The first input plate is preferably arranged axially between the first force transfer region and the internal combustion engine. The first input plate is preferably arranged so that it radially overlaps with the first force transfer region. The first input plate preferably extends radially outwards, starting from the input shaft. An "input plate" should be understood to mean an at least substantially rotationally symmetrical, in particular round, preferably flat, element which is arranged coaxially to the main axis of rotation. The input plate preferably has at least one flat region arranged perpendicularly to the main axis of rotation. In this context, "flat" should be understood to mean that a maximum axial extension of the input disc is in particular less than 70%, preferably less than 50%, and particularly preferably less than 30% of a diameter of the input disc. The input plate is preferably designed as one piece. The input plate is preferably designed as a deformation component. In principle, the input plate can also be designed in several parts. The first wall is preferably formed in one piece with the first input plate. The first input plate preferably forms the first wall. The first actuation space is particularly preferably delimited axially in the direction of the internal combustion engine by the first input plate. The first actuation space is preferably delimited in one direction directly by the first input plate, in particular directly by the first wall. The first actuation space is particularly preferably arranged directly between the first input plate and the first actuation piston. Viewed in the axial direction, the first actuating piston is preferably arranged at least partially on a side of the first force transfer region facing away from the partial transmissions. Viewed in the axial direction, the first actuating piston is preferably arranged on a side of the first force transfer region facing towards the internal combustion engine. The first actuating piston is preferably arranged so that it radially overlaps with the second force transfer region. The second clutch preferably has a second actuation space. The second actuation space is arranged between a second wall and the second actuation piston. The first actuation space is preferably arranged at least partially radially overlapping with the second actuation space. The second actuation space is preferably delimited by the second wall, which is non-rotationally connected to the second partial transmission input shaft. In the case of two rotatably mounted elements, "non-rotationally connected" should be understood to mean that the elements are arranged coaxially to each other and are connected to one another in such a way that they rotate at the same angular speed. The second wall is preferably arranged on a side of the second actuation space facing towards the partial transmissions. The second wall preferably extends radially outwards, starting from the second partial transmission input shaft. The second wall is, in particular, formed integrally with the connecting plate. The connecting plate preferably forms the second wall. The second actuating space is particularly preferably delimited axially in the direction of the partial transmission by the connecting plate. The second actuation space is preferably arranged axially between the connecting plate and the second force transfer region. The second actuation space is preferably directly delimited in one direction by the connecting plate, in particular directly by the second wall. The second actuating space is particularly preferably arranged directly between the connecting plate and the second actuating piston. A "connecting plate" should be understood to mean an at least substantially rotationally symmetrical, in particular round, preferably flat, element that is arranged coaxially to the main axis of rotation. The connecting plate preferably has at least one planar region arranged perpendicularly to the main axis of rotation. In this context, "flat" should be understood to mean that a maximum axial extension of the connecting plate is, in particular, less than 70%, preferably less than 50% and particularly preferably less than 30% of a diameter of the connecting plate. The connecting plate is preferably designed in one piece. "In one piece" is to be understood as being connected at least in a firmly bonded manner, for example by a welding process, an adhesive process, an injection molding process and/or another process that appears sensible to the person skilled in the art, and/or advantageously formed in one piece, such as by manufacture from a single cast and/or by being produced in a single-component or multi-component injection molding process and advantageously from a single blank. The connecting plate is preferably designed as a deformation component. In principle, the connecting plate can also be designed in several parts. An advantageously compact and functional dual clutch transmission can be provided by the design according to the invention. An advantageously high performance of the first clutch can be achieved. The first clutch can be used as a starting clutch on a large pressure gauge, particularly when the starting gear is on the first partial transmission. Advantageously, actuation spaces lying far radially inward can be provided. Furthermore, a particularly efficient and compact arrangement of a dual clutch can be achieved. Furthermore, an advantageously cost-effective arrangement can be achieved.

Furthermore, it is proposed that the dual clutch transmission has a connection element, which is non-rotationally connected to the second partial transmission input shaft, for connecting a rotor of an electric engine, wherein the connection element is arranged radially surrounding the first output disc carrier and axially at least partially overlapping with the second actuating piston. The dual clutch transmission preferably has the electric engine. The electric engine preferably has a rotor and a stator. The rotor preferably has a drive element which is provided to interact with the connection element. A "drive element" should be understood to mean a toothed wheel, a chain wheel, a belt pulley, or similar, which is provided for transmitting a torque, a direction of rotation, and/or a speed of the electric engine. The connection element is preferably formed by an output element. An "output element" should be understood to mean a toothed wheel, a chain wheel, a belt pulley, or similar, which is permanently non-rotationally connected to at least one transmission element and/or a connection unit. The output element is provided for a torque-transmitting connection of the rotor of the electric engine to the dual clutch transmission. The drive element and the output element are particularly preferably coupled to each other. The drive element and the output element are provided, in particular, for translating a torque and/or a speed of the electric engine. As a result, an advantageously powerful and compact arrangement of a dual clutch with connection of an electric engine to the dual clutch can be achieved. A non-rotational connection of the electric engine to a partial transmission can be achieved. This design can advantageously reduce $CO_2$ emissions from a motor vehicle.

Furthermore, it is proposed that the dual clutch transmission has a cylinder section non-rotationally connected to the second partial transmission input shaft and which is arranged radially surrounding and axially at least partially overlapping with the first input disc carrier. The cylinder section is preferably non-rotationally connected to the connecting plate. The cylinder section is, in particular, designed in one piece with the connecting plate. The cylinder section is preferably fixedly connected to the drive element. The electric engine is attached to the cylinder section in particular via the drive element. A "cylinder section" should be understood to mean a rotationally symmetrical element having a hollow-cylindrical basic shape. Preferably, the cylinder section is formed to be tubular. The cylinder section particularly preferably has an axis of symmetry which runs in parallel, in particular coaxially, to the main axis of rotation of the dual clutch transmission. The cylinder section is preferably designed in one piece. As a result, an advantageously efficient and compact arrangement of a dual clutch can be achieved.

In addition, it is proposed that the dual clutch transmission has a second output plate, by means of which the second output disc carrier is non-rotationally connected to the second partial transmission input shaft. The second output plate is preferably arranged on a side of the second force transfer region facing towards the partial transmissions, when seen in the axial direction. The second output plate is preferably arranged so that it overlaps radially with the second actuation space. An "output plate" should be understood to mean an at least substantially rotationally symmetrical, in particular round, preferably flat, element that is arranged coaxially to the main axis of rotation. The output plate preferably has at least one planar region arranged perpendicularly to the main axis of rotation. In this context, "flat" should be understood to mean that a maximum axial extension of the output disc is in particular less than 70%, preferably less than 50%, and particularly preferably less than 30% of a diameter of the output disc. The output plate is preferably designed in one piece. The output plate is preferably designed as a deformation component. In principle, the output plate can also be formed in several parts. As a result, an advantageously efficient and compact arrangement of a dual clutch can be achieved.

Furthermore, it is proposed that the dual clutch transmission has a second input plate, by means of which the second input disc carrier is non-rotationally connected to the input shaft, wherein the second input plate extends radially outwards from a non-rotational connection point on the second input disc carrier. The second input plate and the second input disc carrier are particularly preferably non-rotationally connected to each other via the connection point. The second input plate is preferably arranged axially between the second force transfer region and the partial transmissions. The second input plate is preferably arranged so that it radially overlaps with the first force transfer region. The second input plate is, in particular, non-rotationally connected to the first input disc carrier of the first clutch. As a result, an advantageously efficient and compact arrangement of a dual clutch can be achieved.

Furthermore, it is proposed that the second input plate is arranged on a side of the first force transfer region facing towards the partial transmissions. In particular, the second input plate is arranged so that it radially overlaps with the first force transfer region. As a result, an advantageously compact arrangement of the input plate can be achieved.

In addition, it is proposed that the first output disk carrier is formed as a first inner disc carrier, and the second output disc carrier is formed as a second inner disc carrier. The first input disc carrier is preferably designed as a first outer disc carrier. The second input disc carrier is preferably designed as a second outer disc carrier. The first inner disc carrier preferably carries at least one first inner disc and, particularly preferably, a plurality of first inner discs. Furthermore, the first outer disc carrier preferably carries at least one first outer disc and, particularly preferably, a plurality of first outer discs. The at least one first inner disc and the at least one first outer disc preferably form a first disc packet, particularly preferably in an alternating arrangement. In particular, the first disc set forms the first force transfer region. The second inner disc carrier preferably carries at least one second inner disc and particularly preferably a plurality of second inner discs. Furthermore, the second outer disc carrier preferably carries at least one second outer disc and particularly preferably a plurality of second outer discs. The at least one second inner disc and the at least one second outer disc preferably form a second disc packet, particularly preferably in an alternating arrangement. The second disc set forms in particular the second force transfer region. In this way, an advantageous arrangement and connection of the clutches can be achieved.

Furthermore, it is proposed that a first actuating oil flow and a first centrifugal oil flow can be supplied to the first clutch through the input shaft. Preferably, the first actuating oil flow and the first centrifugal oil flow can be supplied to the first clutch axially from the direction of the internal combustion engine. The first actuating oil flow is preferably coupled to the first actuation chamber of the first clutch. The first centrifugal oil flow is preferably coupled to a first centrifugal oil chamber of the first clutch. As a result, a particularly advantageous oil guide can be achieved.

It is also proposed that a second actuating oil flow and a second centrifugal oil flow can be supplied to the second clutch through the second partial transmission input shaft. The second actuating oil flow and the second centrifugal oil flow can preferably be supplied to the second clutch axially from the direction of the partial transmission. The second actuating oil flow is preferably coupled to the second actuating chamber of the second clutch. The second centrifugal oil flow is preferably coupled to a second centrifugal oil chamber of the second clutch.

In addition, it is proposed that the first actuation space of the first clutch is arranged axially between an internal combustion engine and the second actuation space of the second clutch. The second force transfer region is preferably arranged radially surrounding the first actuation space. As a result, an advantageously compact arrangement of a dual clutch can be achieved.

Further advantages emerge from the description of the FIGURES below. In the FIGURE, an exemplary embodiment of the invention is depicted. The FIGURE, the description of the FIGURE and the claims contain numerous features in combination. The person skilled in the art will expediently also consider the features individually and combine them to make sensible further combinations.

BRIEF DESCRIPTION OF THE DRAWING FIGURE

The sole FIGURE shows a schematic depiction of a dual clutch transmission according to the invention.

DETAILED DESCRIPTION

The sole FIGURE shows a dual clutch transmission 10. The dual clutch transmission 10 is formed by a hybrid dual clutch transmission. The dual clutch transmission 10 is provided for use in a motor vehicle, not shown in more detail. In the present case, the motor vehicle comprises the dual clutch transmission 10. The dual clutch transmission 10 comprises a first partial transmission 12, depicted schematically. The dual clutch transmission 10 comprises a second partial transmission 14, depicted schematically. The first partial transmission 12 is provided to switch gears referred to as odd numbers. The first partial transmission 12 has a first partial transmission input shaft W1. The first partial transmission input shaft W1 is formed as an inner input shaft. The first partial transmission input shaft W1 is formed as a hollow shaft. However, it is also conceivable to form a first partial transmission input shaft W1 as a solid shaft. The second partial transmission 14 is provided for switching gears referred to as even numbers. The second partial transmission 14 has a second partial transmission input shaft W2. The second partial transmission input shaft W2 is formed as an outer input shaft. The second partial transmission input shaft W2 is formed as a hollow shaft. The second partial transmission input shaft W2 is arranged coaxially and radially surrounding the first partial transmission input shaft W1. The first partial transmission 12 and the second partial transmission 14 have several switching units, not depicted in more detail. The switching units are provided to produce switchable connections between transmission shafts, fixed wheels, and/or idler wheels of the partial transmissions 12, 14. In principle, however, it is also conceivable that the first partial transmission 12 is provided for shifting even-numbered gears and the second partial transmission 14 is provided for shifting odd-numbered gears. The second partial transmission input shaft W2 is advantageously arranged radially outside the first partial transmission input shaft W1 and/or the first partial transmission input shaft W1 is formed as an inner partial transmission input shaft and the second partial transmission input shaft W2 as an outer partial transmission input shaft. As a result, a high degree of installation space efficiency can advantageously be achieved. Furthermore, an advantageous dual clutch design can be made possible. The dual clutch transmission 10 has an input shaft W0. The input shaft W0 is coupled to a dual mass flywheel 34 of the motor vehicle. The dual mass flywheel 34 is coupled to an internal combustion engine 36 of the motor vehicle. The dual-mass flywheel 34 is provided to reduce torsional vibrations of the internal combustion engine 36. The input shaft W0 is provided to be driven by the internal combustion engine 36. The dual clutch transmission 10 includes a main axis of rotation 38. The partial transmission input shaft W1, the partial transmission input shaft W2, and the input shaft W0 are arranged concentrically to the main axis of rotation 38.

The dual clutch transmission 10 comprises a transmission housing, not depicted in more detail. The dual clutch transmission 10 has a first clutch K1. The first clutch K1 is allocated to the first partial transmission 12. The first clutch K1 is formed as a disc clutch. The first clutch K1 has at least one inner disc and at least one outer disc. The dual clutch transmission 10 has a second clutch K2. The second clutch K2 is allocated to the second partial transmission 14. The second clutch K2 is formed as a disc clutch. The second clutch K2 has at least one inner disc and at least one outer disc. The first clutch K1 and the second clutch K2 are arranged radially stacked one on top of the other. The second clutch K2 is arranged radially inside the first clutch K1. The first clutch K1 and the second clutch K2 are arranged at least substantially in the same axial extension region.

The first clutch K1 has a first input disc carrier K11, a first output disc carrier K12, a first force transfer region K13, and a first actuating piston B11. The first input disc carrier K11 is formed as a first outer disc carrier. The first output disc carrier K12 is formed as a first inner disc carrier. The first force transfer region K13 is formed by a region of the inner discs and the outer discs of the first clutch K1. The first force transfer region K13 is formed by a disc packet. The first clutch K1 has a first actuation unit B1, which has the first actuation piston B11.

The second clutch K2 has a second input disc carrier K21, a second output disc carrier K22, a second force transfer region K23, and a second actuating piston B21. The second input disc carrier K21 is formed as a second outer disc carrier. The second output disc carrier K22 is formed as a second inner disc carrier. The second force transfer region K23 is formed by a region of the inner discs and the outer discs of the second clutch K2. The second force transfer region K23 is formed by a disc packet. The second clutch K2 has a second actuating unit B2, which has the second actuating piston B21. The first force transfer region K13 is arranged radially surrounding and axially at least partially overlapping with the second force transfer region K23.

The first actuation unit B1 is arranged radially in a region of the first force transfer region K13. The first actuating unit B1 is arranged axially outside of the first force transfer region K13. The first actuating unit B1 is arranged axially on a side of the first force transfer region K13 facing towards the internal combustion engine 36. The first actuation unit B1 is provided for hydraulic actuation of the first clutch K1. A first centrifugal oil flow B15 can be supplied to the first actuating unit B1. The first centrifugal oil flow B15 can be supplied to the first actuation unit B1 from the side of the first actuation unit B1 that faces towards the internal combustion engine 36. The first actuation unit B1 comprises the first actuation piston B11. The first actuating piston B11 is arranged to be axially movable. The first actuation unit B1 has a first actuation chamber B12. The first actuation chamber B12 of the first clutch K1 is arranged on a side of the first force transfer region K13 facing towards the input shaft W0. The first actuation chamber B12 is axially arranged on a side of the first force transfer region K13 facing towards the internal combustion engine 36. A first actuating oil can be supplied to the first actuating chamber B12 by means of a first actuating oil flow B13. A first actuating oil pressure can be built up in the first actuating chamber B12. An axial position of the first actuating piston B11 can be controlled by means of the first actuating oil pressure. When the first actuating oil pressure in the first actuating chamber B12 is high, the first actuating piston B11 is provided to close the first clutch K1. When a first actuating oil pressure in the first actuating chamber B12 is low, a first return spring (not depicted in more detail) is provided to remove the first actuating piston B11 from the first clutch K1. The first actuating piston B11 delimits the first actuating chamber B12 axially on a side of the actuating space B12 facing away from the internal combustion engine 36.

The first actuating unit B1 has a first centrifugal oil chamber B14. The first centrifugal oil chamber B14 is arranged on a side of the first actuating piston B11 arranged opposite the first actuating chamber B12. A first centrifugal oil can be supplied to the first centrifugal oil chamber B14 by means of the first centrifugal oil flow B15, in particular in an open state of the first clutch K1. The first centrifugal oil chamber B14 is provided for centrifugal force compensation. A part of the first centrifugal oil chamber B14 is formed as a first piston guide chamber of the first actuating piston B11. Viewed in the axial direction, the first actuating piston B11 is arranged at least partially on a side of the first force transfer region K13 facing away from the partial transmissions 12, 14. Viewed in the axial direction, the first actuating piston B11 is arranged at least partially on a side of the first force transfer region K13 facing towards the internal combustion engine 36. The first actuating piston B11 is arranged radially overlapping with the second force transfer region K23.

The second actuating unit B2 is arranged radially at least partially in a region of the second force transfer region K23. The second actuating unit B2 is arranged axially at least substantially outside the second force transfer region K23. The second actuating unit B2 is arranged axially on a side of the second force transfer region K23 facing away from the internal combustion engine 36. The second actuating unit B2 is provided for hydraulically actuating the second clutch K2. A second centrifugal oil flow B25 can be supplied to the second actuating unit B2. The second actuating unit B2 comprises the second actuating piston B21. The second actuating piston B21 is arranged to be axially movable. The second actuating unit B2 has a second actuating chamber B22. The second actuating chamber B22 is arranged axially at least substantially outside the second force transfer region K23. The second actuating chamber B22 is arranged axially on a side of the second force transfer region K23 facing away from the internal combustion engine 36. A second actuating oil can be supplied to the second actuating chamber B22 by means of a second actuating oil flow B23. A second actuating oil pressure can be built up in the second actuating chamber B22. By means of the second actuating oil pressure, an axial position of the second actuating piston B21 can be controlled. When a second actuating oil pressure in the second actuating chamber B22 is high, the second actuating piston B21 is provided to close the second clutch K2. When a second actuating oil pressure in the second actuating chamber B22 is low, a second return spring, not depicted in more detail, is provided to remove the second actuating piston B21 from the second clutch K2. The second actuating piston B21 axially delimits the second actuating chamber B22 to a side of the second actuating chamber B22 facing towards the internal combustion engine 36. The second actuation unit B2 has a second centrifugal oil chamber B24. The second centrifugal oil chamber B24 is arranged on a side of the second actuating piston B21 arranged opposite the second actuating chamber B22. A second centrifugal oil can be supplied to the second centrifugal oil chamber B24 by means of a second centrifugal flow B25, in particular in an open state of the second clutch K2. The second centrifugal chamber B24 is provided for centrifugal force compensation. A part of the second centrifugal chamber B24 is formed as a second piston guide chamber of the second actuating piston B21.

The first actuating chamber B12 and the second actuating chamber B22 are arranged at least substantially in the same radial extension region. The first actuating chamber B12 of the first clutch K1 is arranged axially between the internal combustion engine 36 and the second actuating chamber B22 of the second clutch K2. The second force transfer region K23 is arranged radially surrounding the first actuating chamber B12. The first centrifugal oil chamber B14 and the second centrifugal oil chamber B24 are arranged at least substantially in the same radial extension region.

The first actuating oil flow B13 and the first centrifugal oil flow B15 can be supplied to the first clutch K1 through the input shaft W0. The first actuating oil flow B13 and the first centrifugal oil flow B15 can be supplied to the first clutch K1 axially from the direction of the internal combustion engine 36. The first actuating oil flow B13 and the first centrifugal oil flow B15 are supplied to the first clutch K1 axially from one side of the internal combustion engine 36 through the input shaft W0. The first centrifugal oil flow B15 is coupled to the first centrifugal oil chamber B14 of the first clutch K1. The first actuation oil flow B13 is coupled to the first actuating chamber B12 of the first clutch K1. The first actuating oil flow B13 and the first centrifugal oil flow B15 are partially guided by the input shaft W0.

The second actuating oil flow B23 and the second centrifugal oil flow B25 can be supplied to the second clutch K2 through the second partial transmission input shaft W2. The second actuating oil flow B23 and the second centrifugal oil flow B25 can be supplied to the second clutch K2 axially from the direction of the partial transmissions 12, 14. The second actuating oil flow B23 and the second centrifugal oil flow B25 are supplied to the second clutch K2 axially from one side of the partial transmissions 12, 14 through the second partial transmission input shaft W2. The second centrifugal oil flow B25 is coupled to the second centrifugal oil chamber B24 of the second clutch K2. The second actuating oil flow B23 is coupled to the second actuating chamber B22 of the second clutch K2.

The dual clutch transmission 10 has a first input plate 44, by means of which the input shaft W0 is non-rotationally connected to the first input disc carrier K11. The first input plate 44 is arranged axially on a side of the force transfer regions K13, K23 facing away from the partial transmissions 12, 14. The first input plate 44 is arranged axially between the first force transfer region K13 and the internal combustion engine 36. The first input plate 44 is arranged radially overlapping with the first force transfer region K13. The first input plate 44 is arranged radially overlapping with the first force transfer region K13 and the second force transfer region K23. The first input plate 44 is directly connected to the input shaft W0 on a radially inner end. The first input plate 44 extends radially outwards from the input shaft W0. The first input plate 44 is non-rotationally connected to the first input disc carrier K11 of the first clutch K1. The first input plate 44 is directly connected to the first input disc carrier K11.

The first actuation chamber B12 is delimited by a first wall 30 that is non-rotationally connected to the input shaft W0. The dual clutch transmission 10 comprises the first wall 30. The first wall 30 extends radially outwards from the input shaft W0. The first wall 30 is formed by a rotationally symmetrical, plate-shaped element. The first wall 30 is arranged coaxially to the input shaft W0, in particular to the main axis of rotation 38. The first wall 30 is arranged on a side of the first actuating chamber B12 facing away from the partial transmissions 12, 14. The first wall 30 is arranged on a side of the first force transmission region K13 facing towards the internal combustion engine 36. The first actuating chamber B12 is arranged axially between the first wall 30 and the first actuating piston B11. The first wall 30 is integrally formed with the first input plate 44. The first input plate 44 forms the first wall 30. The first actuating chamber B12 is axially delimited in the direction of the internal combustion engine 36 by the first input plate 44. The first actuating chamber B12 is delimited in one direction directly by the first input plate 44, in particular directly by the first wall 30. The first actuating chamber B12 is arranged directly between the first input plate 44 and the first actuating piston B11. The first actuating chamber B12 is delimited radially inwards by the input shaft W0. The first actuating chamber B12 is delimited radially outwards and in the axial direction on the side facing the partial transmissions by the first actuating piston B11. The first actuating chamber B12 is arranged radially overlapping with the second actuating chamber B22.

The first centrifugal oil chamber B14 is delimited radially outwards by a hollow cylindrical extension on a bypass plate 50 of the dual clutch transmission 10, wherein the bypass plate 50 is non-rotationally connected to the input shaft W0. The bypass plate 50 is formed by a rotationally symmetrical, plate-shaped component. The bypass plate 50 is arranged coaxially to the input shaft W0. The bypass plate 50 delimits the first centrifugal oil chamber B14 in the axial direction on a side of the first centrifugal oil chamber B14 facing towards the partial transmissions 12, 14.

The second actuating chamber B22 is delimited by a second wall 32 which is non-rotationally connected to the second partial transmission input shaft W2. The dual clutch transmission 10 comprises the second wall 32. The second wall 32 extends radially outwards from the second partial transmission input shaft W2. The second wall 32 is formed by a rotationally symmetrical, plate-shaped element. The second wall 32 is arranged coaxially to the second partial transmission input shaft W2, in particular to the main axis of rotation 38. The second wall 32 is arranged on a side of the second actuating chamber B22 facing towards the partial transmissions 12, 14.

The dual clutch transmission 10 has a connecting plate 16 that radially overlaps the first force transmission region K13 and is non-rotationally connected to the second partial transmission input shaft W2 and extends radially from the second partial transmission input shaft W2 and is arranged axially between the partial transmissions 12, 14 and the force transfer regions K13, K23. The connecting plate 16 is formed by a rotationally symmetrical, plate-shaped component. The connecting plate 16 is formed in one piece. The connecting plate 16 is formed as a deformation component. The connecting plate 16 is arranged coaxially to the partial transmission input shaft W2. The second actuating chamber B22 is axially limited in the direction of the partial transmissions 12, 14 by the connecting plate 16. The second actuating chamber B22 is arranged axially between the connecting plate 16 and the second force transfer region K23. The second actuating chamber B22 is delimited in one direction directly by the connecting plate 16, in particular directly by the second wall 32. The second actuating chamber B22 is arranged directly between the connecting plate 16 and the second actuating piston B21. The second actuating chamber B22 is delimited radially inwards by the second partial transmission input shaft W2. The second actuating chamber B22 is delimited radially outwardly by a hollow cylindrical extension on the connecting plate 16. The second wall 32 is formed integrally with the connecting plate 16. The connecting plate 16 forms the second wall 32. The second actuating chamber B22 is arranged between the second wall 32 and the second actuation piston B21.

The input shaft W0, the first input disc carrier K11, and the second input disc carrier K21 are non-rotationally connected to one another. The dual clutch transmission 10 has a second input plate 26 by means of which the second input disc carrier K21 is non-rotationally connected to the input shaft W0. The second input plate 26 extends radially outwardly from a non-rotational connecting point 52 on the second input disc carrier K21. The second input plate 26 is directly connected to the second input disc carrier K21. The second input plate 26 is non-rotationally connected at a radial outer end via a cylindrical section to the first input plate 44, by means of which the first input disc carrier K11 is non-rotationally connected to the input shaft W0. The second input plate 23 is directly connected to the second input disc carrier K21 at a radially inner end. The second input plate 26 is arranged axially between the second force transfer region K23 and the partial transmissions 12, 14. The second input plate 26 is arranged radially overlapping with the first force transfer region K13. The second input plate 26 is arranged on a side of the first force transfer region K13 facing towards the partial transmissions 12, 14. The second input plate 26 is non-rotationally connected to the first input disc carrier K11 of the first clutch K1. The second input plate 26 is arranged axially between the first force transfer region K13 and the connection plate 16. The second input plate 26 is arranged radially overlapping with the first force transfer region K13. The input plates 26, 44 are each formed by rotationally symmetrical, round elements that are arranged coaxially to the main axis of rotation 38. The input plates 26, 44 are each formed in one piece. The input plates 26, 44 are each designed as a deformation component.

The first output disc carrier K12 is non-rotationally connected to the first partial transmission input shaft W1. The dual clutch transmission 10 has a first output plate 46 by means of which the first output disc carrier K12 is non-rotationally connected to the first partial transmission input shaft W1. The first output plate 46 is arranged radially overlapping with the second actuating chamber B22. The first output disc 46 is arranged radially within the first force transfer region K13. The first output plate 46 is arranged axially at least partially overlapping with the first force transfer region K13. The first output plate 46 is axially connected between the first wall 30 and the connection plate 16 to the first partial transmission input shaft W1. The output plate 46 is fixedly connected to the first partial transmission input shaft W1 at an end of the first partial transmission input shaft W1 facing towards the internal combustion engine 36.

The second output disc carrier K22 is non-rotationally connected to the second partial transmission input shaft W2. The dual clutch transmission 10 has a second output plate 28 by means of which the second output disc carrier K22 is non-rotationally connected to the second partial transmission input shaft W2. The second output plate 28 is arranged radially overlapping with the second actuating chamber B22. The second output plate 28 is arranged radially within the second force transfer region K23. The second output plate 28 is arranged on a side of the second force transfer region K23 facing towards the partial transmissions 12, 14, when seen in the axial direction. The second output plate 28 is connected axially between the first output plate 46 and the connection plate 16 to the second partial transmission input shaft W2. The second output plate 28 is fixedly connected to the second partial transmission input shaft W2 at an end of the second partial transmission input shaft W2 facing towards the internal combustion engine 36.

The second output plate 28 delimits the second centrifugal oil chamber B24 in the axial direction on a side of the second centrifugal oil chamber B24 facing away from the partial transmissions 12, 14. The output plates 28, 46 are each formed in one piece. The output plates 28, 46 are each designed as a deformation component. Alternatively, and not depicted further here, the second output disc carrier K22 can be non-rotationally connected directly to the connecting plate 16 radially outside the second centrifugal oil chamber B24. In this alternative, which is not depicted, the second output plate 28 is formed as part of the connection plate 16.

Furthermore, the dual clutch transmission 10 comprises a plurality of sealing elements, of which two sealing elements 40, 42 are provided with a reference sign in FIG. 1 as an example. The sealing elements 40, 42 are provided to seal gaps between components of the actuating units B1, B2 with respect to an actuating oil.

The dual clutch transmission 10 comprises an electric engine 18. The electric engine 18 comprises a stator 48 and a rotor 20. The electric engine 18 serves to hybridize the dual clutch transmission 10. The dual clutch transmission 10 has a connection element 22, which is non-rotationally connected to the second partial transmission input shaft W2, for connecting the rotor 20 of the electric engine 18. The connection element 22 is arranged radially surrounding the first output disc carrier K12 and axially at least partially overlapping with the second actuating piston B21. The rotor 20 comprises a drive element provided to interact with the coupling element 22. The coupling element 22 is formed by an output element. The connection element 22 is provided for connecting the rotor 20 of the electric machine 18 to the dual clutch transmission 10, in particular in a torque-transmitting manner.

The dual clutch transmission 10 has a cylinder section 24 non-rotationally connected to the second partial transmission input shaft W2 and which is arranged radially surrounding and axially at least partially overlapping with the first input disc carrier K11. The cylinder section 24 is non-rotationally connected to the connection plate 16. The cylinder section 24 is non-rotationally connected to the second partial transmission input shaft W2 via the connecting plate 16. The cylinder section 24 is formed integrally with the connecting plate 16. The cylinder section 24 is further fixedly connected to the connecting element 22. The electric engine 18 is connected to the cylinder section 24 via the connecting member 22. The cylinder section 24 is rotatably mounted with respect to the input shaft W0.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the FIGURES enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

LIST OF REFERENCE NUMERALS

10 Dual clutch transmission
12 Partial transmission
14 Partial transmission
16 Connecting plate
18 Electric engine
20 Rotor
22 Connecting element
24 Cylinder section
26 Input plate
28 Output plate
30 Wall
32 Wall
34 Dual mass flywheel
36 Internal combustion engine
38 Main axis of rotation
40 Sealing element
42 Sealing element
44 Input plate
46 Output plate
48 Stator
50 Bypass plate
52 Connecting point
B1 Actuating unit
B11 Actuating piston
B12 Actuating chamber
B13 Actuating oil flow
B14 Centrifugal oil chamber
B15 Centrifugal oil flow
B2 Actuating unit
B21 Actuating piston
B22 Actuating chamber
B23 Actuating oil flow
B24 Centrifugal oil chamber
B25 Centrifugal oil flow
K1 Clutch
K11 Input disc carrier
K12 Output disc carrier
K13 Force transfer region
K2 Clutch
K21 Input disc carrier
K22 Output disc carrier
K23 Force transfer region
W0 Input shaft
W1 Partial transmission input shaft
W2 Partial transmission input shaft

The invention claimed is:
1. A dual clutch transmission, comprising:
an input shaft;
a first clutch having a first input disc carrier, a first output disc carrier, a first force transfer region, and a first actuating piston;
a second clutch having a second input disc carrier, a second output disc carrier, a second force transfer region, and a second actuating piston;
a first partial transmission having a first partial transmission input shaft;
a second partial transmission having a second partial transmission input shaft; and
a connecting plate,
wherein the input shaft, the first input disc carrier, and the second input disc carrier are non-rotationally connected to one another, wherein the first output disc carrier is non-rotationally connected to the first partial transmission input shaft, wherein the second output disc carrier is non-rotationally connected to the second partial transmission input shaft, wherein the second partial transmission input shaft is arranged coaxially to and radially surrounding the first partial transmission input shaft, wherein the first force transfer region is arranged radially surrounding and axially at least partially overlapping with the second force transfer region, wherein the connecting plate radially overlaps with the first force transfer region, is non-rotationally connected to the second partial transmission input shaft, extends radially from the second partial transmission input shaft, radially overlaps with at least the first force transfer region and is arranged axially between 1) the first and second partial transmissions and 2) the force transfer regions, wherein a first actuating chamber of the first clutch is arranged on a side of the first force transfer region facing towards the input shaft and is delimited by a first wall, which is non-rotationally connected to the input shaft.

2. The dual clutch transmission of claim 1, further comprising:
a connecting element non-rotationally connected to the second partial transmission shaft for connecting a rotor of an electric engine, wherein the connecting element is arranged radially surrounding the first output disc carrier and axially at least partially overlapping with the second actuating piston.

3. The dual clutch transmission of claim 1, further comprising:
a cylinder section non-rotationally connected to the second partial transmission input shaft, wherein the cylinder section is arranged radially surrounding and axially at least partially overlapping with the first input disc carrier.

4. The dual clutch transmission of claim 1, further comprising:
a second output plate that non-rotationally connects the second output disc carrier to the second partial transmission input shaft.

5. The dual clutch transmission of claim 1, further comprising:
a second input plate that non-rotationally connects the second input disc carrier to the input shaft, wherein the second input plate extends radially outwards starting from a non-rotational connecting point on the second input disc carrier.

6. The dual clutch transmission of claim 5, wherein the second input plate is arranged on a side of the first force transmission region facing towards the first and second partial transmissions.

7. The dual clutch transmission of claim 1, wherein the first output disc carrier is a first inner disc carrier and the second output disc carrier is a second inner disc carrier.

8. The dual clutch transmission of claim 1, wherein the input shaft is configured such that a first actuating oil flow and a first centrifugal oil flow of the first clutch can be supplied through the input shaft.

9. The dual clutch transmission of claim 1, wherein the second partial input shaft is configured such that a second actuating oil flow and a second centrifugal oil flow of the second clutch can be supplied through the second partial transmission input shaft.

10. The dual clutch transmission of claim 1, wherein the first actuating chamber of the first clutch is arranged axially between an internal combustion engine and a second actuating chamber of the second clutch.

* * * * *